(12) United States Patent
Cambou et al.

(10) Patent No.: US 12,107,973 B1
(45) Date of Patent: Oct. 1, 2024

(54) PUF BASED KEY GENERATION FOR LATTICE AND CODE CRYPTOGRAPHY

(71) Applicant: Arizona Board of Regents on Behalf of Northern Arizona University, Flagstaff, AZ (US)

(72) Inventors: Bertrand F Cambou, Flagstaff, AZ (US); Michael Gowanlock, Flagstaff, AZ (US); Bahattin Yildiz, Flagstaff, AZ (US); Dina Ghanaimiandoab, Flagstaff, AZ (US); Kaitlyn Lee, Flagstaff, AZ (US); Stefan W Nelson, Flagstaff, AZ (US); Christopher Philabaum, Flagstaff, AZ (US); Alyssa J Stenberg, Flagstaff, AZ (US); Jordan A Wright, Flagstaff, AZ (US)

(73) Assignee: ARIZONA BOARD OF REGENTS ON BEHALF OF NORTHERN ARIZONA UNIVERSITY, Flagstaff, AZ (US)

( * ) Notice: Subject to any disclaimer, the term of this patent is extended or adjusted under 35 U.S.C. 154(b) by 344 days.

(21) Appl. No.: 17/523,551

(22) Filed: Nov. 10, 2021

Related U.S. Application Data

(60) Provisional application No. 63/112,067, filed on Nov. 10, 2020.

(51) Int. Cl.
| | |
|---|---|
| *H04L 29/06* | (2006.01) |
| *G06F 21/00* | (2013.01) |
| *H04L 9/08* | (2006.01) |
| *H04L 9/30* | (2006.01) |
| *H04L 9/32* | (2006.01) |

(52) U.S. Cl.
CPC .......... *H04L 9/3278* (2013.01); *H04L 9/0825* (2013.01); *H04L 9/0861* (2013.01); *H04L 9/3093* (2013.01); *H04L 9/3263* (2013.01)

(58) Field of Classification Search
None
See application file for complete search history.

(56) References Cited

U.S. PATENT DOCUMENTS

| | | | |
|---|---|---|---|
| 2020/0162271 A1* | 5/2020 | Cambou | ............. H04L 63/0435 |
| 2023/0091028 A1* | 3/2023 | Norrod | ................ H04L 9/3263 |
| | | | 713/189 |

OTHER PUBLICATIONS

B. Cambou et al., Statistical Analysis to Optimize the Generation of Cryptographic Keys from Physical Unclonable Functions, SAI Computing Conference, IEEE, 2020.
(Continued)

*Primary Examiner* — Lisa C Lewis
(74) *Attorney, Agent, or Firm* — Quarles & Brady LLP

(57) ABSTRACT

Systems and methods of improving public key infrastructure using PUF arrays are disclosed. The systems and methods are usable to improve PKI based on Lattice and Code cryptography. In the disclosed system, a client device includes an enrolled PUF array, and a server device acting as a Certification Authority includes an image of the PUF array including previously measured responses data for the devices in the PUF array. The CA sends a set of addresses to the client device, which generates a public key from measuring the response of PUF devices with the addresses. The CA receives the generated public key, and determines that the enrolled PUF was used to generate the key.

16 Claims, 10 Drawing Sheets

(56) References Cited

OTHER PUBLICATIONS

R. Campbell et al., "Evaluation of Post-Quantum Distributed Ledger Cryptography. Open Access," JBBA, vol. 2, 2019.
B. Cambou, "Unequally Powered Cryptograpgy with PUFs for Networks of IoTs"; IEEE Spring Simulation Conference, 2019.
B. Cambou et al., "Response-Based Cryptographic Methods with Ternary Physical Unclonable Functions"; 2019 SAI FICC, IEEE; 2019.
P. Kampanakisy et al., "Two Post-Quantum Signature Use-cases: Non-issues, Challenges and Potential Solutions," 7th ETSI/IQC Quantum Safe Cryptography Workshop, 2019.
C. Peikert et al., Algebraically Structured LWE Revisited. Theory of Cryptography. Conf., 2019, pp. 1-23. https://doi.org/10.1007/978-3-030-36030-6_1.
B. Cambou et al., "Ternary Computing to Strengthen Information Assurance, Development of Ternary State based public key exchange," IEEE, 2018.
E. Kiktenko et al., A Quantum Secured Blockchains. Open Source, arXiv: 1705.09258v3 [quant-ph], 2018.
N. Koblitz et al., "A Riddle Wrapped in an Enigma," Cryptology ePrint Archive, Paper 2015/1018, http:/eprint.iacr.org/2015/1018.
I. Papakonstantinou et al., "Physical Unclonable Function Design Technologies: Advantages & Tradeoffs," Computer and Network Security, ISBN: 978-3-319-58423-2, 2018.
B. Cambou et al., "Design of Physical Unclonable Functions with ReRAM and Ternary States," Proceedings of the 11th Annual Cyber and Information Security Research Conference, pp. 1-8, 2016.
J. Delvaux et al., "Helper Data Algorithms for PUF-Based Key Generation: Overview and Analysis," IEEE Transactions on Computer-Aided Design of Integrated Circuits and Systems, vol. 34, No. 6, pp. 889-902, 2015.
C. Herder et al., "Physical Unclonable Functions and Applications: A Tutorial," Proceedings of the IEEE, vol. 102, No. 8, pp. 1126-1141, 2014.
H. Kang et al., "Cryptographie Key Generation From Puf Data Using Efficient Fuzzy Extractors," 16th International Conference on Advanced Communication Technology, pp. 23-26, 2014.
M. Taniguchi et al., "A stable key generation from PUF responses with a Fuzzy Extractor for cryptographic authentications," In IEEE 2nd Global Conference on Consumer Electronics (GCCE), 2013.
O. Regev, "New Lattice-Based Cryptographic Constructions," Journal of the ACM, vol. 51, Issue 6, pp. 899-942, 2004.
R. Mceliece, "A Public-Key Cryptosystem Based on Algebraic Coding Theory," In: DSN Prog. Rep., Jet Prop. Lab., California Inst. Technol., pp. 114-116, 1978.
B. Cambou et al., "Replacing Error Correction by Key Fragmentation and Search Engines to Generate Error-Free Cryptographic Keys from PUFs," CryptArchi 2019.
B. Cambou, "Unequally Powered Cryptography With PUFs for Networks of IoTs," IEEE Spring Simulation Conference, 2019.
B. Cambou et al., "Ternary Computing to Strengthen Cybersecurity, Development of Ternary State based Public Key Exchange", 2018 SAI Computing Conference, IEEE 2018.

* cited by examiner

PUF BASED KEY GENERATION FOR LATTICE AND CODE CRYPTOGRAPHY

CROSS-REFERENCE TO RELATED APPLICATIONS

The present application claims priority to U.S. Provisional Application 63/112,067 entitled Physical Unclonable Function-Based Key Generation For Lattice and Code Cryptography, filed on Nov. 10, 2021, which is incorporated herein by reference in its entirety.

STATEMENT CONCERNING FEDERALLY-FUNDED RESEARCH

This invention was made with government support under Grant No. 1004251 awarded by the Air Force Research Laboratory. The government may have certain rights in the invention.

BACKGROUND OF THE INVENTION

Information is frequently encrypted to protect against eavesdropping and unauthorized access using encryption schemes based on the use of one or more encryption keys and other keyless encryption schemes. Encryption schemes are frequently used in conjunction with authentication. In most public key infrastructure (PKI) schemes for applications such as cryptographic currencies, financial transactions, secure mail, and wireless communications, the public keys are generated by private keys with RSA and elliptic curve cryptography (ECC). These private keys are natural numbers, typically 3,000-bits long for RSA and 256-bits long for ECC. For example, in the case of ECC, the primitive element of the elliptic curve cyclic group is multiplied by the private key to find the public key.

Conventional ECC and RSS PKI has drawbacks. In particular, while the problems that must be solved in order to derive the private keys are too difficult, currently, for existing computers, it is now anticipated that Quantum Computers (QC) will be able to break both RSA and ECC when the technology to manufacture enough quantum nodes becomes available.

Alternative PKI schemes have been developed to counter the threat from quantum computing. For example, lattice-based algorithms exploit hardness to resolve problems such as the closest vector problem (CVP), learning with error (LWE), and learning with rounding (LWR). These algorithms share some similarities with the knapsack cryptographic problem.

Public-private cryptographic key pair generation for client device i can be based on polynomial computations in a lattice ring as described in FIG. 1. According to the arrangement of FIG. 1, a random number generator generates a first data stream called Seed a(i), which is used to compute a first data stream for the key generation; in the case of LWE, Seed a(i) is shared openly in the network. A second random number generation is used to generate a second data stream called Seed b(i), which used to compute a second data stream for the private key Sk(i). The Seed b(i) is kept secret. The public key Pk(i) is computed from both data streams and is openly shared.

An example of an arrangement for LWE/LWR-based cryptography using the concepts introduced in FIG. 1 is shown in FIG. 2. There, a matrix A(i) is generated from Seed a(i). Two vectors $s_1(i)$ and $s_2(i)$ are generated from Seed b(i). The vector t(i) is computed: $A(i)s_1(i)+s_2(i) \rightarrow t(i)$. Both Seed a(i) and t(i) become the public key Pk(i). Both $s_1(i)$ and $s_2(i)$ become the private key Sk(i).

Cryptographic algorithms such as FALCON, which uses NTRU (Nth degree of TRUncated polynomial ring) arithmetic is also based lattice-based cryptography. The parameters of the scheme include a large prime number N, a large number q, and a small number p that are both used for modulo arithmetic. Two numbers $d_f$ and $d_g$ are used to truncate the polynomials f and g. The key generation cycle for client device i, as shown in FIG. 3, is the following:

Generation of the two truncated polynomials f(i) and g(i) from Seed a(i) and Seed b(i);
Computation of $F_q(i)$ which is the inverse of polynomial f(i) modulo q;
Computation of $F_p(i)$ which is the inverse of polynomial f(i) modulo p;
Computation of polynomial h(i): $p \cdot F_q(i) \cdot g(i) \rightarrow h(i)$;
The private key Sk(i) is $\{f(i); F_p(i)\}$;
The public key Pk(i) is h(i).

The polynomials f and g are not always usable, as they are subject to some pre-conditions. The client device needs to try several possible random numbers and select the ones giving acceptable private keys.

In addition to the more difficult Lattice based methods described above, Code-based algorithms provide another alternative source of key generation schemes more resistant to quantum computing. Code-based algorithms such as Classic McEliece is implemented with binary Goppa codes with underlying computations in finite Galois fields $GF(2^m)$. The parameters are an irreducible polynomial of degree t, the field exponent m, and code length n. The resulting code has error-correction capability of t errors; the information-containing part of the code word has a size of $k=n-m \times t$ and has a generator matrix G with a size of $k \times n$.

The block diagram of FIG. 4 shows an example of public-private key generation for code-based cryptography and client device i:

Seed a(i) is used to create a random invertible binary $k \times k$ scrambling matrix $S_i$;
Seed b(i) is used to create a random $n \times n$ permutation matrix $P_i$;
The public key $Pk(i) = \hat{G}(t)$ is computed with the generator matrix G: $S_i \cdot G \cdot P_i \rightarrow \hat{G}(i)$;
The private key Sk(i) is $\{G; S_i^{-1}; P_i^{-1}\}$ As part of a PKI, public-private key pairs generated according to any of the aforementioned methods can be used to securely transmit shared secret keys though key encryption mechanism (KEM). Additionally, public-private key pairs can be used to digitally sign messages with DSA. FIG. 5 shoes an arrangement for providing these two functions. In the block diagram of FIG. 5, a public key Pk(2) of Client 2 encapsulates the shared secret key of Client 1 that can only be viewed by Client 2, thanks to its private key Sk(2) that reverses the encapsulation. Client 1 can also use its private key Sk(1) to digitally sign a message that can be only verified with the public key Pk(1). Here DSA is providing non-alteration and non-repudiation in the transaction. The integrity of such architecture relies on the secure generation and distribution of the public-private key pairs to the client devices that are participating to the PKI; the identification of the client devices and trust in their public keys, and the sharing of the public keys among participants.

Most PKIs rely on certificate authorities (CA) and registration authorities (RA) to offer a trusted environment and establish the required conditions discussed above. This architecture is vulnerable to several threats, including loss of identity, man-in-the-middle attacks, and side-channel attacks in which the private keys are exposed during KEM and DSA. Further improvements to PKI generally, and PKI using matrix and code key generation would be advantageous.

BRIEF SUMMARY

Inventive embodiments are directed to improvements to PKI, for example, PKI where the keys are generation by matrix or code methods. Inventive embodiments use physical unclonable functions (PUF) at a client device and a previously generated image of the PUF at a Certification Authority device to authenticate public keys generated by the client device by matrix or code methods.

In one embodiment, a method is disclosed of validating a cryptographic key generated by a Client device. The Client device has an addressable PUF array, which has been previously characterized (i.e., measured). The characterization data are stored at a server device, i.e., a CA. the method involves providing to the client device data indicating a set of addresses of its PUF array, retrieving previously stored response data for devices in the PUF array having the addresses (i.e., by reading those data from the image or lookup table at the CA), and receiving from the client device, a first cryptographic key. The method also involves determining, on the basis of the retrieved previously stored response data (i.e., the retrieved data from the image), that the received cryptographic key was generated on the basis of measured response data of devices in the PUF array having the addresses.

In one aspect, the method further includes generating a component of a second cryptographic key on the basis of previously stored response data and comparing the generated component with a received component of the first cryptographic key. That is to say, the CA can determine that the key was generated by the imaged PUF by generating its own candidate key components, and then looking at components of the key received from the client. One embodiment, this may done by generating a seed bit stream K' on the basis of the retrieved previously stored response data for devices in the PUF array having the addresses, and generating the component of a second cryptographic key (i.e., a candidate key) on the basis of the bitstream. Additionally, especially in cases where the generated key component does not match a received key component, the CA can engage in an iterative process where it adds noise to the seed bitstream K', generates another candidate key component, then compares the new candidate component to the received component. In some embodiments, the key components can be generated from the seed bitstream K' on the basis of Lattice or Code cryptographic key generation techniques.

In certain aspects, the CA generates a candidate key from the PUF image, and compares it to the received key from the client. In other aspects, the CA generates a key component from the PUF image and compares that to a received key component. In other aspects, the CA receives a message digest including a value, that is a hash of a bitstream generated by the Client by measuring the PUF response at the indicated addresses. The CA can then determine that the bitstream is valid (and will generate a valid key), by generating its own bitstream from the PUF image, hashing that, and comparing the two has values.

In another aspect, if the CA determines that the received cryptographic key was generated on the basis of measured response data of devices in the PUF array having the addresses send the Client, by any of the comparison methods above, it determines that the received key is valid, and it writes the key to a register in a registration authority.

In another embodiment, a method for a client to submit cryptographic keys for validation by a certification authority is described. The method includes receiving, from the certification authority, data indicating a set of addresses in addressable physical-unclonable-function ("PUF") array of PUF devices. The client device then measures the responses from the PUF devices in the array having the received addresses. This generates a seed bitstream K. The client then generates a cryptographic key, including its components, on the basis of the seed bitstream K. In certain aspects, this generation step is performed in accordance with Lattice or Code cryptographic key generation methods, which may involve the use of random number generators as well as the seed bitstream. Once generated, the key is then sent to a CA for validation.

In some embodiments, the method includes intentionally injecting noise into bitstream K prior to calculating the key components. In some embodiments, the client hashes seed bitstream K, and sends the hash value to the CA for validation.

Other embodiments include computing devices with programmable processors executing the method steps set forth above. Certain embodiments are directed to a cryptographic system, with two processors, a client processor in communication with a PUF, and a CA processor in communication with a PUF image, where the respective processors carry out the CA/server and Client side method steps described above.

The use of networks including physical unclonable functions (PUFs) to improve various arrangements for PKI has certain advantages. Primarily, the incorporation of PUFs can mitigate the vulnerabilities of PKIs to the attacks outlined above. PUF technology exploits the variations created during fabrication to differentiate a device from all other devices, acting as a hardware "fingerprint". Solutions based on PUFs embedded in the hardware of a system node, such as key generating client, can mitigate the risk of an opponent deriving keys from side channel or other attacks, or from reading the keys stored in non-volatile memories. The keys for the PKI can be generated on demand with one-time use in such a way that stealing a key become useless as new keys are needed at each transaction.

One challenge in incorporating and using PUFS in client devices for PKI is that PUFs can be erratic. This means that when PUF responses are used as the basis for key generation, it may be difficult for another party to generate a matching key from a stored PUF image, or to use the PUF image to verify that the generated key originated from a previously characterized (i.e., imaged) PUF. A single-bit mismatch in a cryptographic key is not acceptable for most encryption protocols. Typically, the use of error-correcting (ECC) methods, helper data, and fuzzy extractors to minimize the levels of errors is helpful to address the erratic response of the PUF. The erratic response of a client that is generating keys from a PUF, however, may actually be advantageous, since the erratic response may interfere with the ability of 3rd party attackers to derive a client's private keys or the data streams used to generate them. Inventive embodiments describe PUF-based key generation and validation methods that account for erratic PUF response, and in some embodiments, even intentionally induce noise in the PUF response as an additional security features.

In certain embodiments, a client device uses a PUF for generation of cryptographic keys, and a certification authority (CA) uses search engines, such as response-based cryptography (RBC), which can account for the validation of erratic PUF-based keys. The embodiments described herein may leverage HPC and GPU technologies are valuable to enhance the ability of the CA to confirm the validity of the public key generated by the client devices.

Additional advantageous will become clear upon consideration of the detailed description of the preferred embodiments taken in conjunction with the accompanying drawings.

BRIEF DESCRIPTION OF THE DRAWINGS

The drawings described herein constitute part of this specification and includes exemplary embodiments of the present invention which may be embodied in various forms. It is to be understood that in some instances, various aspects of the invention may be shown exaggerated or enlarged to facilitate an understanding of the invention. Therefore, drawings may not be to scale.

DETAILED DESCRIPTION

The described features, advantages, and characteristics may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus appearances of the phrase "in one embodiment," "in an embodiment," and similar language throughout this specification may, but do not necessarily, all refer to the same embodiment. References to "users" refer generally to individuals accessing a particular computing device or resource, to an external computing device accessing a particular computing device or resource, or to various processes executing in any combination of hardware, software, or firmware that access a particular computing device or resource. Similarly, references to a "server" refer generally to a computing device acting as a server, or processes executing in any combination of hardware, software, or firmware that access control access to a particular computing device or resource.

Conventional systems and methods for secure communication frequently rely upon encryption of messages using encryption keys which may be symmetrical or asymmetrical (e.g., in public key encryption schemes). Such key-based encryption schemes have disadvantages. First keys must be generated and stored by various parties, introducing the possibility that the keys may be compromised by a malicious party. Additionally, key-based encryption schemes may be vulnerable to brute force attacks wherein a malicious party may discover the key given access to a message encrypted with that key.

Figure 6:
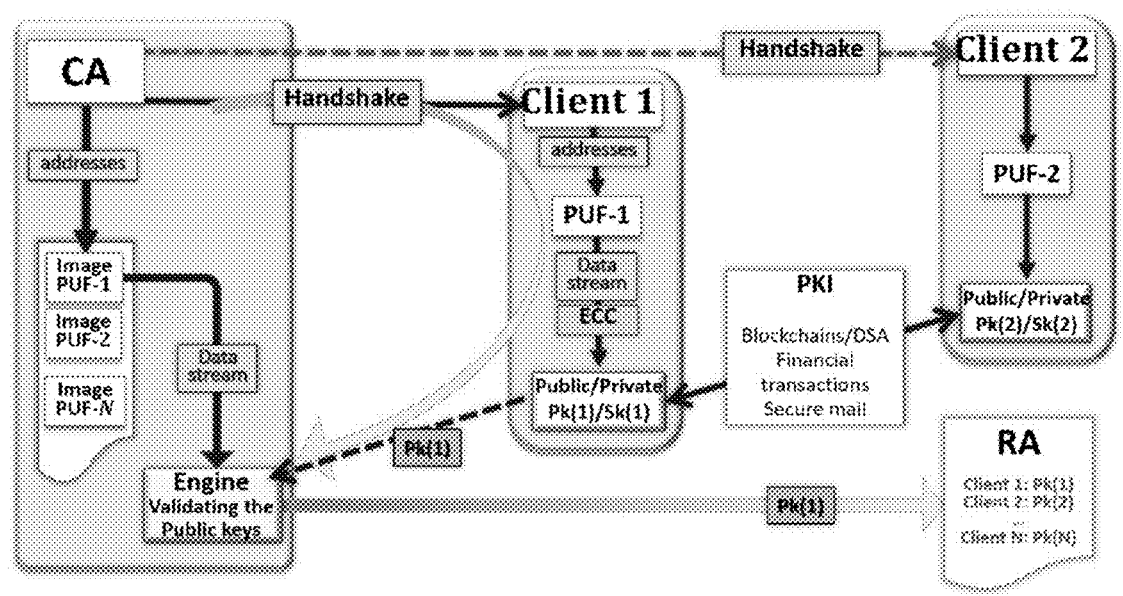
FIG. 6 depicts an example of PUF-based public key infrastructure.

Accordingly, embodiments disclosed herein address these and other shortcomings by using physical unclonable function (PUF) generators (APGs) for key generation in certain types of PKI. FIG. 6 depicts an example depicts an example of PUF-based public key infrastructure. In the embodiment of FIG. 6, a client (e.g., Client 1 or Client 2), which may be a computing device having a programmable computer processor, memory and non-volatile storage, has an APG including a PUF (e.g., PUF-1). The PUF is an addressable array of elements (i.e., devices) that produces a unique and unpredictable, but repeatable, response when challenged with a given stimulus. In the context of this disclosure, a challenge is any information transmitted to an APG to cause production of an expected response (referred to as a "challenge response") corresponding to that information. Challenge responses may be generated by accessing devices (or ranges of devices) in an array of PUF devices belonging to the APG. Along these lines, a challenge may be input supplied to an APG which is used to produce a response having one or more expected values which depend upon characteristics' of the PUF array belonging to the APG to which the challenge is issued. The appropriate challenge response may be derived from those characteristics using instructions stored by the APG or other processing circuitry, received by the APG or other processing circuitry and/or additional information supplied to the APG or other processing circuitry (such as a password of a user). In one simple non-limiting example, a challenge might simply be returning the values stored by devices of a PUF array at a specified address or range of addresses. In other non-limiting examples, a challenge might include instructions to perform a mathematical, logical, or other operation(s) on those values.

Non-limiting examples of measurable physical characteristics of devices used in PUF arrays are time delays of transistor-based ring oscillators and transistor threshold voltages. Additional examples include data stored in SRAM or information derived from such data. For instance, in a PUF array based on SRAM cells, an example of such physical characteristics may be the effective stored data values of individual SRAM devices (i.e., "0" or "1") after being subjected to a power-off/power-on cycle. Because the initial state (or other characteristics) of an individual PUF device may not be perfectly deterministic, statistics produced by repeated measurements of a device may be used instead of single measurements. In the example of an SRAM-based PUF device, the device could be power-cycled 100 times and the frequency of the "0" or "1" state could be used as a characteristic of that device. Other non-limiting examples of suitable characteristics include optical measurements. For instance, a PUF device may be an optical PUF device which, when illuminated by a light source such as a laser, produces a unique image. This image may be digitized and the pixels may be used as an addressable PUF array. A good PUF should be predictable, and subsequent responses to the same challenge should be similar to each other (and preferably identical).

Additional non-limiting examples of non-limiting examples of measurable physical characteristics of devices used in PUF arrays are currents induced by an applied input voltage or current, voltages of various circuit elements during operation of a PUF device in response to an input or other stimulus. Further non-limiting examples may include derived quantities such as resistance, conductance, capacitance, inductance, and so on. In certain embodiments, such characteristics of a device may be functions of an input or stimulus level of the device. For example, a current-voltage characteristics of memristors and other devices may be non-linear. Thus, the measured resistance of a memristor will depend on a current or voltage level applied during the measurement process. If a memristor or device with similar characteristics is operated within a non-hysteretic regime, the measured resistance may be a predictable function of the input stimulus (e.g., an input current supplied by a current source). Thus the relationship between applied current and voltage measured across a memristor (or between applied voltage and current measured through the memristor) is one example of a non-linear transfer function which can be exploited to produce multiple discrete or continuous characteristic values using a single PUF device.

Referring again to FIG. 6, Client 1 may generate a public/secret (private) key pair (Pk(1), Sk(1)) by challenging the PUF. In one embodiment, the PUF is a set of addresses of devices within the PUF read or measured under predetermined conditions. In some embodiments, the challenge may include the measurement conditions for the measurement of one or more of devices. The challenge may be derived from challenge data or a challenge message passed from the CA client 1. In certain embodiments, the challenge may be derived from the handshake message and additional inputs, such as from a random number generator at the client.

The PUF devices, upon being measured or interrogated, generate a data stream, which is the PUF response values, or is derived therefrom. Because the PUF's response may be erratic (i.e., may drift over time or with temperature), the data stream or the response values giving rise thereto may be subject to error correction ("ECC"—here), which is used to convert the datastream into a corrected datastream that more closely matches a datastream generated by the PUF when it was previously characterized (e.g., when it was imaged to generate the PUF images stored at the CA). The corrected datastream may be used to generate a public/secret key pair, according to any of the conventional methods described above.

FIG. 6 also shows a CA, or certification authority, which may be one or more computing devices having a programmable processor, memory and non-volatile storage. The CA stores one or more images of PUFs located at one or more clients. For example, CA may store a PUF image for PUF-1 and another PUF image for PUF-2, and so on. The PUF images are data reflecting a relevantly exhaustive characterization of the PUFs on the client devices. It is contemplated that client devices will engage in an enrollment process with the CA. This would occur once in a secure environment. During enrollment, the PUFs on the client devices are exhaustively measured (i.e., all the devices of each PUF are measured over the entire range of contemplated measurement stimuli), and the resulting responses are stored in a lookup table (e.g., Image PUF-1, Image PUF-2, etc.).

In the arrangement of FIG. 6, after enrollment, the CA may serve to certify or validate public keys generated by one or more of the clients for transactions and communication between the clients. In the FIG. 6 example, in a handshake procedure, the CA sends to client 1 a list of PUF addresses. Alternatively the CA can determine a list of PUF addresses, and then send to Client on data from which that set of addresses may be derived. Additionally, the data sent from the CA to the client may include other measurement parameters relevant to challenging the client's PUF, e.g., temperature or electrical or other conditions under which the PUF devices at the addresses are to be measured. The client challenges its PUF on the basis of the addresses received or derived from data received from the CA, and generates a key pair according to the methods described above. The client then passes the public key Pk(1) to the CA for validation.

The CA reviews its own stored image of the client's PUF, which may include retrieving previously stored responses corresponding to the addresses passed to the client or derivable by the client on the basis of the handshake and/or message data. This step may also include retrieving previously stored responses corresponding to the addresses that were measured under measurement conditions sent to the PUF, or derivable by the PUF on the basis of the handshake data. The retrieved PUF image data is then used to verify that received key Pk(1) was generated by a client in possession of PUF-1. In the simplest case, this may be done by the CA generating its own corresponding public key from the stored response data according to the same method used by the client to generate its key. However, for reasons that will be explained relating to the instability of the client PUF, in some embodiments, a search engine is used to generate candidate public keys on the basis of the stored image data, which are then compared to the received key Pk(1). Pk(1) is determined to be valid when the search engine converges to a candidate key that could have been generated by response data received by the client from PUF-1. If the key Pk(1) is validated, it may be registered in a Registration Authority (CA). Other devices (e.g., Client 2), may then use Pk(1), which is now trusted, to communicate with client 1, or may assume that transactions or other messages signed with Pk(1) originated from Client 1.

Figure 7:
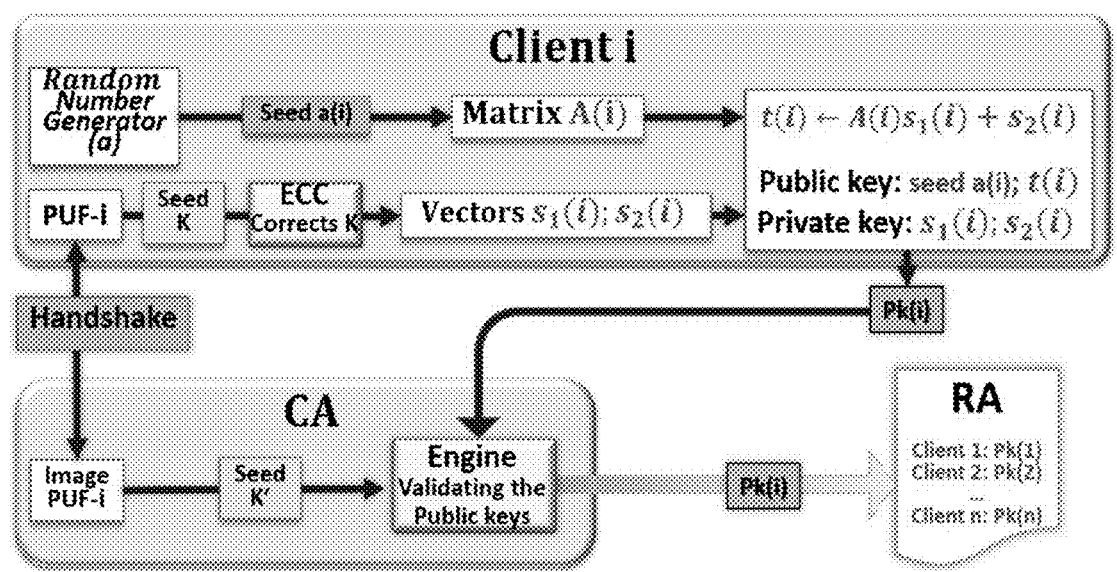
FIG. 7 depicts PUF-based key pair generation for LWE/LWR.

The basic PUF-based PKI described above may be extended to systems using LWE/LWR Lattice-Based Cryptography and key generation. This novel protocol to generate public-private key pairs with PUFs for LWE/LWR lattice cryptography is shown in FIG. 7. In the arrangement of FIG. 7, a random number generator at the client (a) is used for the generation of Seed a(i) which is public information. However, Seed k, which is used for the generation of the private key Sk(i) is generated from the PUF. For example seed k may be PUF responses corresponding to a series of addresses of PUF devices identified during a handshaking process between the CA and the client.

An outline of an exemplary protocol for generating a key pair for LWE/LWR cryptography follows.

The CA uses a random numbers generator and hash function to be able to point at (i.e., identify and access stored responses from) a set of addresses in the image of the PUF-i. In certain embodiments, the random numbers generator is at the CA, but in other embodiments, the CA may receive a random number generated elsewhere, for example, by the client as part of a handshaking exchange. In certain embodiments, a random numbers stream generated at the CA is shared with the Client as part of the handshaking process. All methods by which the a random numbers stream is used to identify addresses in the PUF image at the CA, and then to identify the same addresses in the PUF at the Client, which may then be measured at those addresses, is within the scope of the invention and applicable to this and other embodiments.

From the determined addresses, a stream of bits called Seed K' is generated by the CA, which may be the stored PUF responses corresponding to the addresses.

The CA communicates to Client (i) through a handshake the instructions needed to find the same set of addresses in the PUF.

Client (i) uses the PUF to generate the stream of bits called Seed K, which may be the measured responses of the addresses of the PUF devices corresponding to the addresses received from the CA, or addresses derived from data received from the CA.

Ideally, the two data streams Seed K' and Seed k are identical, but in practice, they will be merely similar, but slightly different from each other, due to natural physical variations and drifts occurring in PUFs.

In one embodiment, Client (i) applies error-correcting codes (ECC) to reduce the difference between Seed K and Seed K'; the corrected, or partially corrected, data stream is used to generate the vectors s1(i) and s2(i).

Client (i) independently uses a random numbers generator (a) to generate a second data stream Seed a(i) which is used for the computation of the Matrix A(i).

The vector t(i) is computed: $A(i) \, s1(i)+s2(i) \rightarrow t(i)$.

The private key Sk(i) is $\{s1(i); s2(i)\}$.

The public key Pk(i) is $\{Seed \, a(i); t(i)\}$.

Client (i) communicates to the CA through the network the public key Pk(i).

The CA uses a search engine to verify that Pk(i) is correct. The search engine initiates the validation by generating a candidate public key from Seed a(i), which is read from received Pk(i), and Seed K', with the same lattice cryptography codes used by the Client. The resulting candidate public key is compared to Pk(i). If the resulting public key is not Pk(i), an iteration process gradually injects errors into Seed K' and computes the corresponding public keys. This error injection process is intended to simulate the results of the drift or erratic response of the Client's PUF, and results in the computation of candidate public keys that the Client could have generated from perturbations of the measured PUF response. The search converges when a match in resulting public key is found or when the CA concludes that the public key is bad. This may occur after the process is run a predetermined number of times, or when the noise injected into the Seed K' stream exceeds a predetermined threshold. If the validation is positive, the public key Pk(i) is posted online by the RA.

Additional disclosure regarding the operation of the search engine described above will now be provided. As was stated, the CA's goal is to determine that the Pk(i) received from the Client for validation could have been generated by the same PUF for which the Client has PUF image data. To do this, the CA computes candidate public keys, or the components of candidate public keys, by perturbing the stored PUF responses corresponding to the addresses being used by the Client, then computing the components of a candidate Pk, then comparing those components to components of the received Pk(i). This is the equivalent of finding a Seed K' that could have generated the received Pk(i), which includes the random seed a(i) and the vector t(i), computed from the Client's Seed K. One exemplary algorithm for accomplishing this includes the steps of:

1. Generate a vector t(i)' from seed a(i) and seed K'
2. Compare t(i)' to t(i) (which is part of received Pk(i). If they are identical then K'=K
3. If they are different, generate all seed K' with one error, and the corresponding vectors t's. If one of these vectors match t(i), then K is known. When seed K is 256-bits long, the search engine can try 256 different seeds, each with one bad bit.
4. Iterate by progressively increasing the number of bad bits to recover K, until a predetermined timeout is reached.

In an alternative embodiment, the Client may hash the seed K, and transmit the hash value as a message digest to the server, together with the public key, Pk(i). The CA may then hash K' to produce a second message digest, which is compared to the received message digest. If there is no match, the CA then begins flipping bits in K', and hashing the resultant values, producing additional message digests, which are compared. Applicants have determined that this method of finding a K' that matches K may be faster than having the CA computing candidate vectors t(i)' to match with the received t(i).

The protocol described in reference to FIG. 6 may be used to generate and validate single use key pairs that are generated for each transaction. The random numbers generator of the first step recited above can generate new data streams which point at different portions (i.e., address ranges) of the PUFs, thereby triggering the generation of new key pairs.

The search engine step that seeks to generate a matching candidate Pk(i) (or components thereof) at the CA has certain security advantages. As is explained above, the method does not assume that the received Pk(i) will identically match a corresponding candidate Pk generated at the CA from PUF image data for the same addresses. Rather, the CA searches for a matching candidate Pk generated by perturbing Seek K'. Because there is no expectation of an immediate match, noise can be intentionally added at the client to Seed K, to increase security. Adding noise to Seed K, in effect, increases the processing load on the CA by expanding its search space for candidate public keys to match Pk(i), which is now further from ideal because of the additional noise. In cases where the CA is equipped with HPCs or GPUs, it can likely manage the additional work within a reasonable time frame. Potentially hostile entities spoofing the CA, which may lack those computing resources, will not be able to search the expanded search space in a reasonable time frame.

There are some differences between LWE and LWR in various implementations.

FIG. 7 shows an example implementation of public key verification usable for LWE rather than LWR. In the example arrangement of FIG. 7, Seed K and the PUF are used to generate the two vectors s1(i) and s2(i), and the "public" vector t(i) is computed by $A(i) \, s1(i)+s2(i) \rightarrow t(i)$. An LWR implementation uses Seed K to generate vector s1(i), while a constant vector h(i) can be generated independently for the PUF or other ways. The public vector t(i) is computed in a similar way: $A(i) \, s1(i)+h(i) \rightarrow t(i)$.

Part of FIG. 7 shows ECC (error correction codes, not to be confused with elliptic curve cryptography that share the same acronym) as a way to reduce the differences between Seed K generated by the PUF and Seed K' generated by the image of the PUF by the server/CA. For the reasons described above, this error correction step can be eliminated when the search engine of the CA is able to handle enough errors. Experimentally, Applicants determined that 3 to 5 bad erratic bits out of a stream of 256 bits can be recovered. Conversely, injecting a low level of error in Seed K could enhance security for both LWE and LWR schemes which are designed to successfully decrypt noisy cipher texts.

Figure 1:
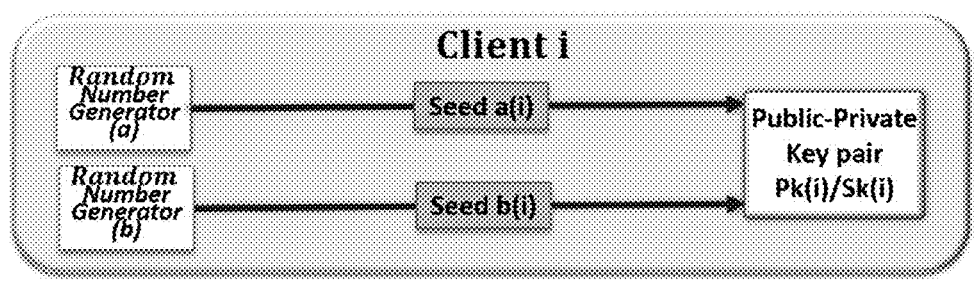
FIG. 1 depicts an example of conventional public-private key generation for public key cryptography.
Figure 2:
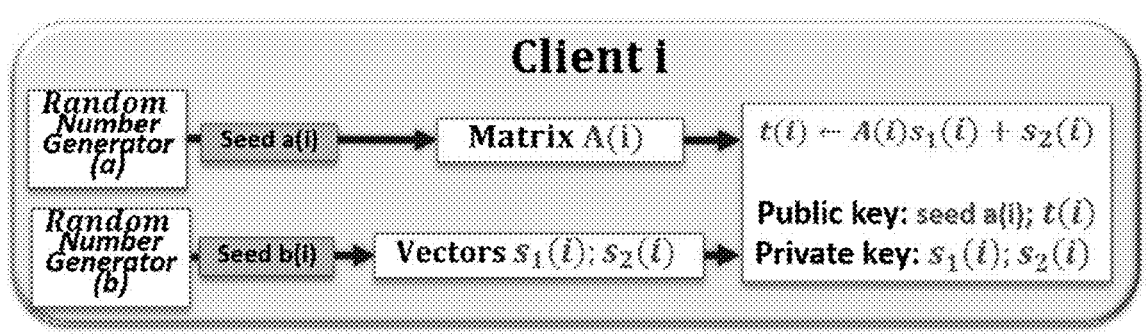
FIG. 2 depicts an example of public-private key generation for learning with error (LWE)/learning with rounding (LWR)-based cryptography.
Figure 3:
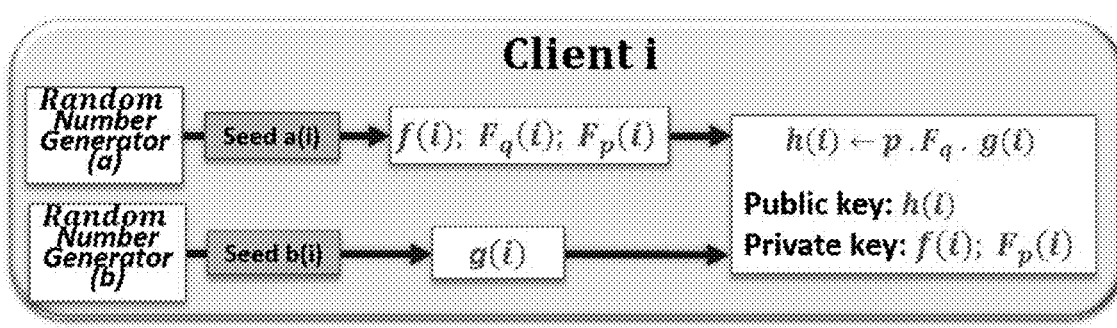
FIG. 3 depicts an example of public-private key generation for Nth degree of truncated polynomial ring (NTRU) cryptography.
Figure 4:
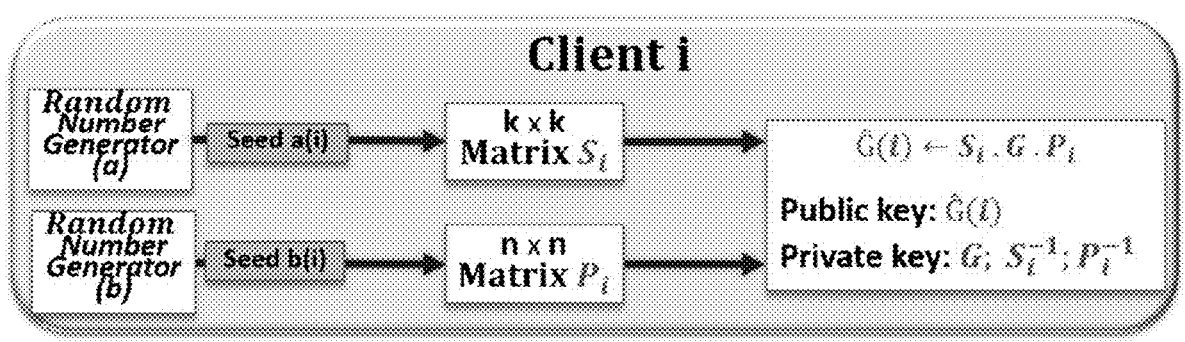
FIG. 4 depicts an example of public/private key generation for code-based cryptography.
Figure 5:
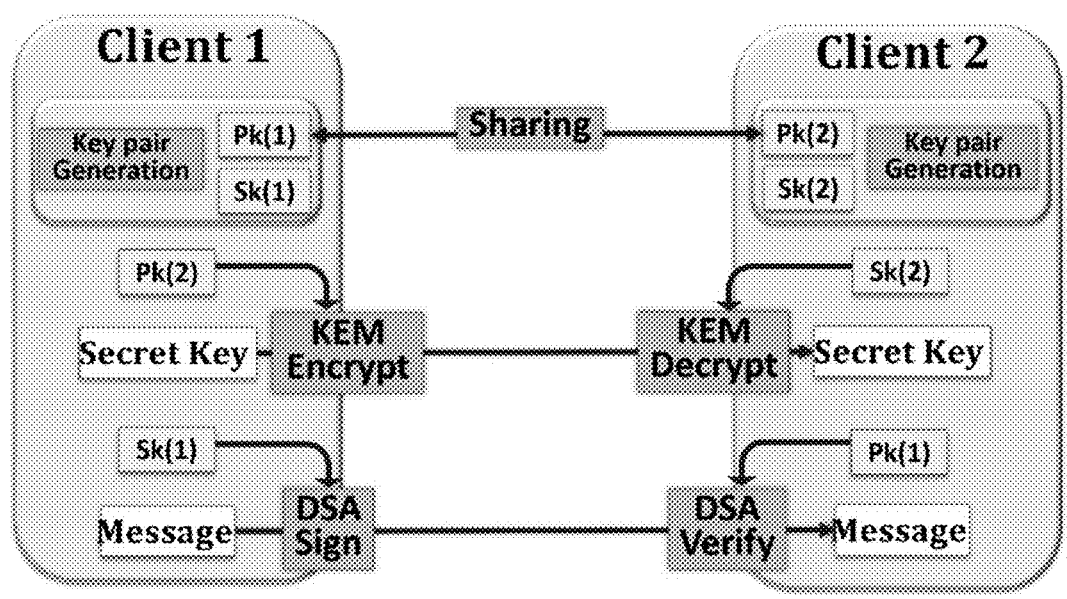
FIG. 5 depicts an example of a communication protocol between two client devices with lattice-based cryptography.
Figure 8:
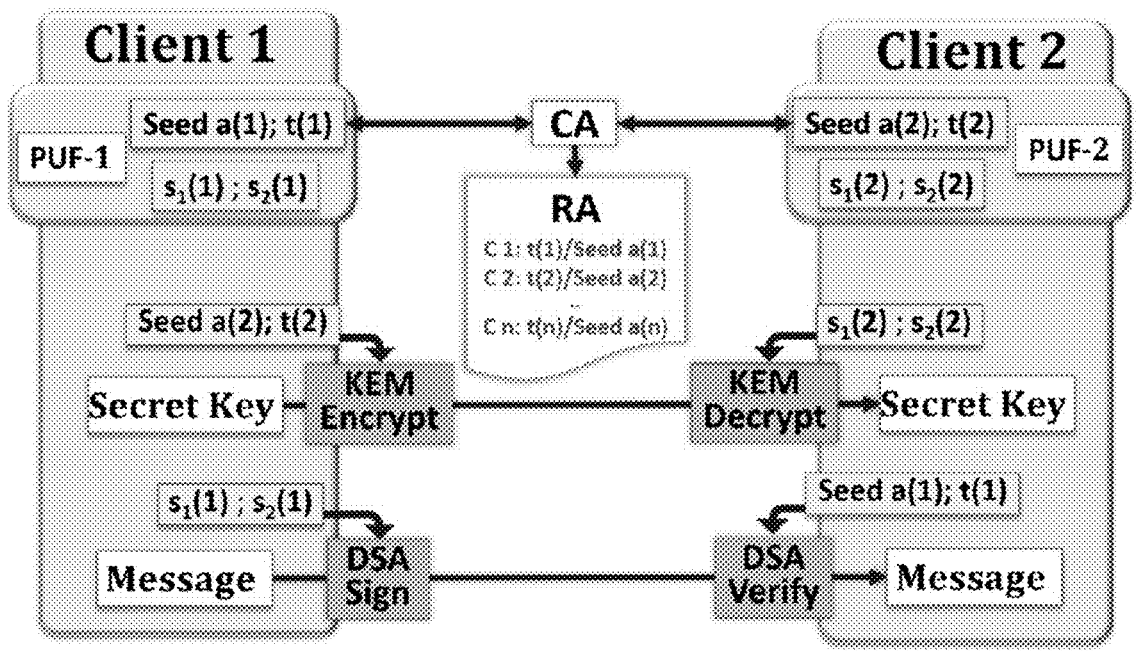
FIG. 8 depicts LWE/LWR-based PKIs with PUFs.

PUFs embedded in the client devices of a PKI network can strengthen security by enhancing the device-to-device trust level. FIG. 8 shows how the addition of PUFs can improve a PKI network (like that shown above in FIG. 5), engaged in secret key sharing and trusted message signing (using DSA). As can be seen in FIG. 8 and will be described, LWE/LWR based cryptography with PUFs as described herein brings an additional layer of protection for the client devices. In the arrangement of FIG. 8, a portion of the public key, Seed a(i), is under the control of the client device, not the CA., while the control of the PUF and its image is shared with the CA.

Referring now to the example of FIG. 8, Clients 1 and 2 exchange public keys (Pk(1) and Pk(2)) derived according to the methodology set forth in FIG. 7. These are verified by the CA (again according to the FIG. 7 method) and stored in the registry at the RA, which shows storage of t(1)/a(1) for C1, etc. Each client may use the public key of the other client, each of which have been validated by the CA, to encrypt a secret key ("KEM"), which is sent to the other client where it can be decrypted using that client's generated secret key. For example, Client 1 may encrypt a secret key using Client 2's public key (a(2); t(2)), and the secret key can be recovered by Client 2 with its secret key Sk(2), which is $s_1(2)$; $s_2(2)$. The reverse process may occur. Additionally, each client may sign a message using its secret key (in the case of Client 1, $S_1(1)$, $s_2(1)$), and the message can verified as having originated with Client by application of Client 1's public key, which again is in the possession of Client 2.

Figure 9:
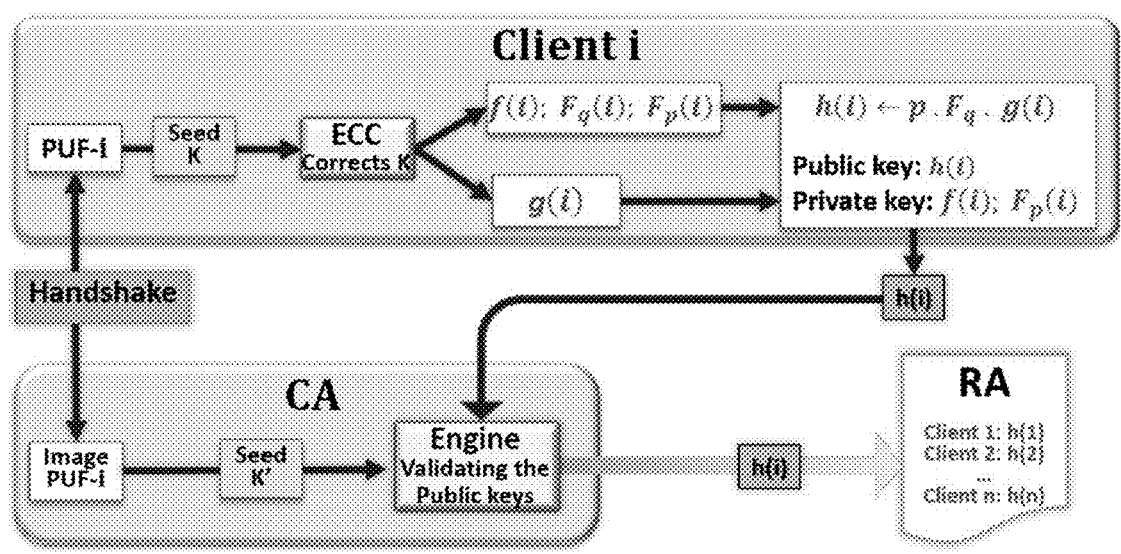
FIG. 9 depicts PUF-based key pair generation for NTRU.

Inventive embodiments apply similar PUF based techniques to improving NTRU Lattice-Based Cryptography. One example of the novel protocols to generate public/private key pairs with PUFs for NTRU lattice cryptography is shown in FIG. 9. This overall protocol is similar than the one presented previously for LWE/LWR in FIG. 7. However, in the example of FIG. 9, the only source of randomness is the PUF. Seed K that is generated from the PUF is used to compute both the public key Pk(i) and the private key Sk(i). A hash function, such as SHA-3, with an extended output function (XOF), such as SHAKE, allows the generation of a long stream of bits from Seed K which is needed to compute the two polynomials f(i) and g(i) in the NTRU. This protocol is also applicable for single use key pairs that are generated for each transaction, and the search engine described in Step 11 can benefit from noise injection and high-performance computing.

The brief outline of a protocol generating a key pair for NTRU cryptography is the following:
  The CA uses random numbers to point at a set of addresses in the image of the PUF-i.
  From these addresses a stream of bits called Seed K' is generated by the CA.
  The CA sent the handshake to the Client (i) to find the same addresses. This may include sending the addresses, or data from which the addresses can be determined by the Client.
  Client (i) uses the PUF to generate Seed K.
  Client (i) optionally applies ECC on Seed K and generates the truncated polynomials f(i) and g(i).
  Computation of $F_p$ and $F_q$.
  The polynomial h(i) is computed: p·Fq(i)·g(i)→h(i).
  The private key Sk(i) is {f(i); Fp(i)};
  The public key Pk(i) is h(i);
  Client (i) communicates to the CA through the network the public key h(i);

The CA uses a search engine to verify that h(i) is correct;
  If the validation is positive, the public key h(i) is posted online by the RA.

The search to determine that h(i) is correct may take several forms, for example, one of the options described above in connection with FIG. 7. For example, the CA can compute candidate polynomials h on the basis of seed k', and then it may repeat the process while sequentially flipping bits through k' until it computes a match. Alternatively, a more direct approach may be taken where the Client sends the CA a message digest including a hash of k, and the CA may then compare candidate hashes of k' until it finds a match. If no match is located before a predetermined timeout, the public key is not validated.

Figure 10:
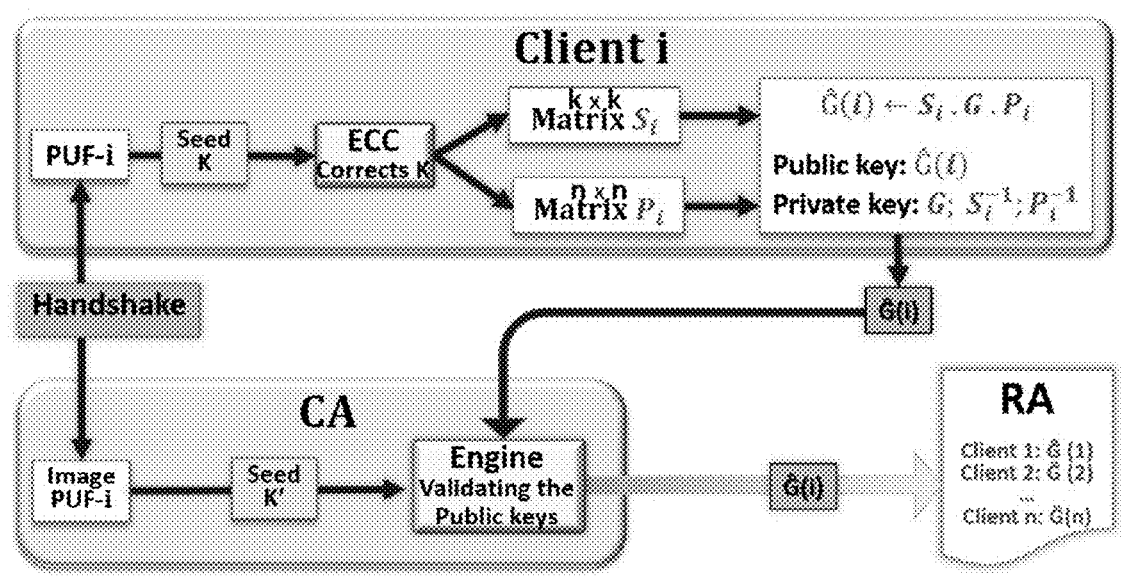
FIG. 10 depicts PUF-based key pair generation for code-based cryptography.

The techniques described herein may also be applied to improve Code-Based Cryptography. One example of novel protocols to generate the key pairs with PUFs for code-based cryptography is shown in FIG. 10. The overall protocol is similar than the ones presented above. As it is done with NTRU, the only source of randomness in the arrangement of FIG. 10 is the PUF. Seed K that is generated from the PUF and is used to compute the public key pairs. Similarly, a hash function, such as SHA-3, with a XOF, such as SHAKE, allows the generation of a long stream of bits from Seed K which is needed to compute the two matrices S(i) and P(i) of the code, as well as a random vector used for encryption. Like the protocols presented above, single use key pairs may be generated for each transaction. Additionally, noise may be intentionally injected into Seek K where the CA has access to high-performance computing.

The brief outline of a protocol generating key pairs for Code-based cryptography is the following:
  The CA uses random numbers to point at a set of addresses in the image of the PUF-i;
  From these addresses, a stream of bits called Seed K' is generated by the CA;
  The CA sends the handshake to the Client (i) to find the same addresses;
  Client (i) uses the PUF to generate Seed K;
  Client (i) applies ECC on Seed K and generates the matrices S(i) and P(i); Computation of Si-1 and Pi-1;
  The Matrix Ĝ(i) is computed with the generator matrix G: Si·G·Pi→Ĝ(i);
  The private key Sk(i) is {G; Si-1; Pi-1};
  The public key Pk(i) is (i);
  Client (i) communicates to the CA through the network the public key Ĝ(i);
  The CA uses a search engine to verify that G(i) is correct;
  If the validation is positive, the public key G(i) is posted online by the RA.

Again, as described above, the CA may search for a match to G(i) for iteratively computing candidate keys as Seed K' is changed, or it may compare K and K' more directly, for example, by iteratively comparing hashes of those bit strings.

The described features, advantages, and characteristics may be combined in any suitable manner in one or more embodiments. One skilled in the relevant art will recognize that the circuit may be practiced without one or more of the specific features or advantages of a particular embodiment. In other instances, additional features and advantages may be recognized in certain embodiments that may not be present in all embodiments.

In the foregoing description, several computing devices are described as Clients, CAs and RA. It will be appreciated by the person of ordinary skill that the invention provides systems and methods applicable to one or more server hardware computing devices (e.g., the CA and/or RA) and client hardware computing devices (e.g., the Clients), communicatively coupled to a network, and each comprising at least one processor executing specific computer-executable instructions within a memory. The memory may be transitory or non-transitory. The processing functionality associated with all computing devices may be included in a single processor in a single machine, multiple processors in a single machine, or distributed processes located physically remotely from another in multiple machines. The memory storing computer executable instructions may be local to the processor(s), or may be distributed, as in a cloud computing environment. It will be appreciated that the method steps and algorithms described above may be computer implemented methods, performed by programmable computer processors executing computer readable, computer executable instructions.

Reference throughout this specification to "one embodiment," "an embodiment," or similar language means that a particular feature, structure, or characteristic described in connection with the embodiment is included in at least one embodiment. Thus, appearances of the phrase "in one embodiment," "in an embodiment," and similar language throughout this specification may, but do not necessarily, all refer to the same embodiment.

The exemplary structures disclosed herein are for illustrative purposes and are not to be construed as limiting. In addition, variations and modifications can be made on the aforementioned structures without departing from the concepts of the present invention and such concepts are intended to be covered by the following claims unless these claims by their language expressly state otherwise.

The invention claimed is:

1. A method of validating a cryptographic key generated by a client device having an addressable physical-unclonable-function ("PUF") array of PUF devices, comprising:
   providing, to the client device, data indicating a set of addresses in the PUF array;
   retrieving previously stored response data for devices in the PUF array having the addresses;
   receiving, from the client device, a first cryptographic key;
   determining, on the basis of the retrieved previously stored response data, that the received cryptographic key was generated on the basis of measured response data of devices in the PUF array having the addresses.

2. The method of claim 1, wherein determining, on the basis of the retrieved previously stored response data, that the received cryptographic key was generated on the basis of response data of devices in the PUF array having the addresses, comprises generating a component of a second cryptographic key on the basis of previously stored response data and comparing the generated component with a received component of the first cryptographic key.

3. The method of claim 2, further including generating a seed bit stream K' on the basis of the retrieved previously stored response data for devices in the PUF array having the addresses, and generating the component of a second cryptographic key on the basis of the bitstream.

4. The method of claim 3, further comprising adding noise to the seed bitstream K' prior to generating the component of the second cryptographic key.

5. The method of claim 3, wherein generating a component of a second cryptographic key on the basis of previously stored response data comprises using seed bitstream K' to calculate key components on the basis of a Lattice or Code cryptography method.

6. The method of claim 3, further comprising receiving a message digest including a value, hashing the bitstream K', and comparing the hashed bitstream K' to the value.

7. The method of claim 1, further comprising, if it is determined that the received cryptographic key was generated on the basis of measured response data of devices in the PUF array having the addresses, writing the key to a register in a registration authority.

8. The method of claim 1, further comprising enrolling the client device by measuring and storing response data for all the PUF devices in the array.

9. A cryptographic system, comprising:
   a Client computing device having an addressable physical-unclonable-function ("PUF") array of PUF devices;
   a certification authority ("CA") computing device having non-volatile storage having an image of the array of PUF devices, the image including data reflecting previously measured responses of the array of PUF devices; the CA including a programmable processor in communication with non-volatile memory including computer executable instructions operable to cause the CA's processor to:
   send, to the Client device, data indicating a set of addresses of devices the PUF array;
   receive, from the Client device, a Client cryptographic key;
   retrieve data reflecting previously measured responses of the array of PUF devices having the addresses;
   determine, on the basis of the retrieved data, whether the received Client cryptographic key was generated on the basis of measuring responses of the array of PUF devices having the addresses at the Client.

10. The system of claim 9, further including computer executable instructions operable to cause the CA's processor to:
    generate a seed bit stream K' on the basis of the retrieved data reflecting previously measured responses of the array of PUF devices having the addresses, and generate a component of a candidate public key on the basis of the retrieved data;
    compare the component of the candidate cryptographic key with a received component of the Client cryptographic key.

11. The system of claim 10, further including computer executable instructions operable to cause the CA's processor to:
    add noise to the seed bit stream K' prior to generating the component of a candidate public key on the basis of the retrieved data.

12. The system of claim 10, wherein generating a component of a candidate public key on the basis of the retrieved data comprises computing key components from the seed bit stream K' using a Lattice or Code cryptography method.

13. The system of claim 9, further including computer executable instructions operable to cause the CA's processor to:
    receive a message digest from the client device
    generate a seed bit stream K' on the basis of the retrieved data reflecting previously measured responses of the array of PUF devices having the addresses;
    hash the seed bit stream K';
    compare the hashed seed bit stream K' to the message digest, and
    determine, that the received Client cryptographic key was generated on the basis of measuring responses of the array of PUF devices having the addresses at the Client on the basis of the comparison between the hashed seed bit stream K' and the message digest.

14. The system of claim 9, wherein the Client device includes a programmable processor in communication with non-volatile memory including computer executable instructions operable to cause the Client device's processor to
- receive, from the CA device, data indicating a set of addresses in the PUF array;
- measure responses from the devices in the PUF array having the addresses;
- generate an encryption key on the basis of the measured responses, and
- send the encryption key to the CA device.

15. The system of claim 14, further including computer executable instructions operable to cause the Client device's processor to: generate the encryption key using a Lattice or Code cryptography method.

16. The system of claim 14, further including computer executable instructions operable to cause the Client device's processor to generate a seed bitstream K from the responses from the devices in the PUF array having the addresses and send a message digest to the Client device including a hash of the seed bitstream K.

* * * * *